United States Patent [19]
Tanaka et al.

[11] Patent Number: 6,094,222
[45] Date of Patent: *Jul. 25, 2000

[54] IMAGE PICKUP APPARATUS USING EYE POINT DISPERSION IN FOCUS CONTROL

[75] Inventors: Taeko Tanaka; Kitahiro Kaneda, both of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/730,298

[22] Filed: Oct. 11, 1996

Related U.S. Application Data

[62] Division of application No. 08/490,515, Jun. 14, 1995, Pat. No. 5,594,500, which is a continuation of application No. 07/959,680, Oct. 13, 1992, abandoned.

[30] Foreign Application Priority Data

Oct. 17, 1991 [JP] Japan ................... 3-269474
Nov. 6, 1991 [JP] Japan ................... 3-290051

[51] Int. Cl.$^7$ .................................. H04N 5/232
[52] U.S. Cl. ................ 348/346; 348/345; 348/350
[58] Field of Search ..................... 348/345, 349, 348/350, 354, 355, 356, 346; 396/96, 121

[56] References Cited

U.S. PATENT DOCUMENTS 5,253,008  10/1993  Konishi et al. ................ 396/51
5,619,264   4/1997  Yoshimura et al. ............. 348/352

*Primary Examiner*—Tuan Ho
*Attorney, Agent, or Firm*—Robin, Blecker & Daley

[57] ABSTRACT

A focus control apparatus comprises a first detector for detecting a focus state of an object image formed on an image screen, a second detector for detecting a dispersion (degree of spread) of an eye point of a photographer on the image screen, and a control unit for controlling the focus state using outputs from the first and second detectors.

26 Claims, 12 Drawing Sheets

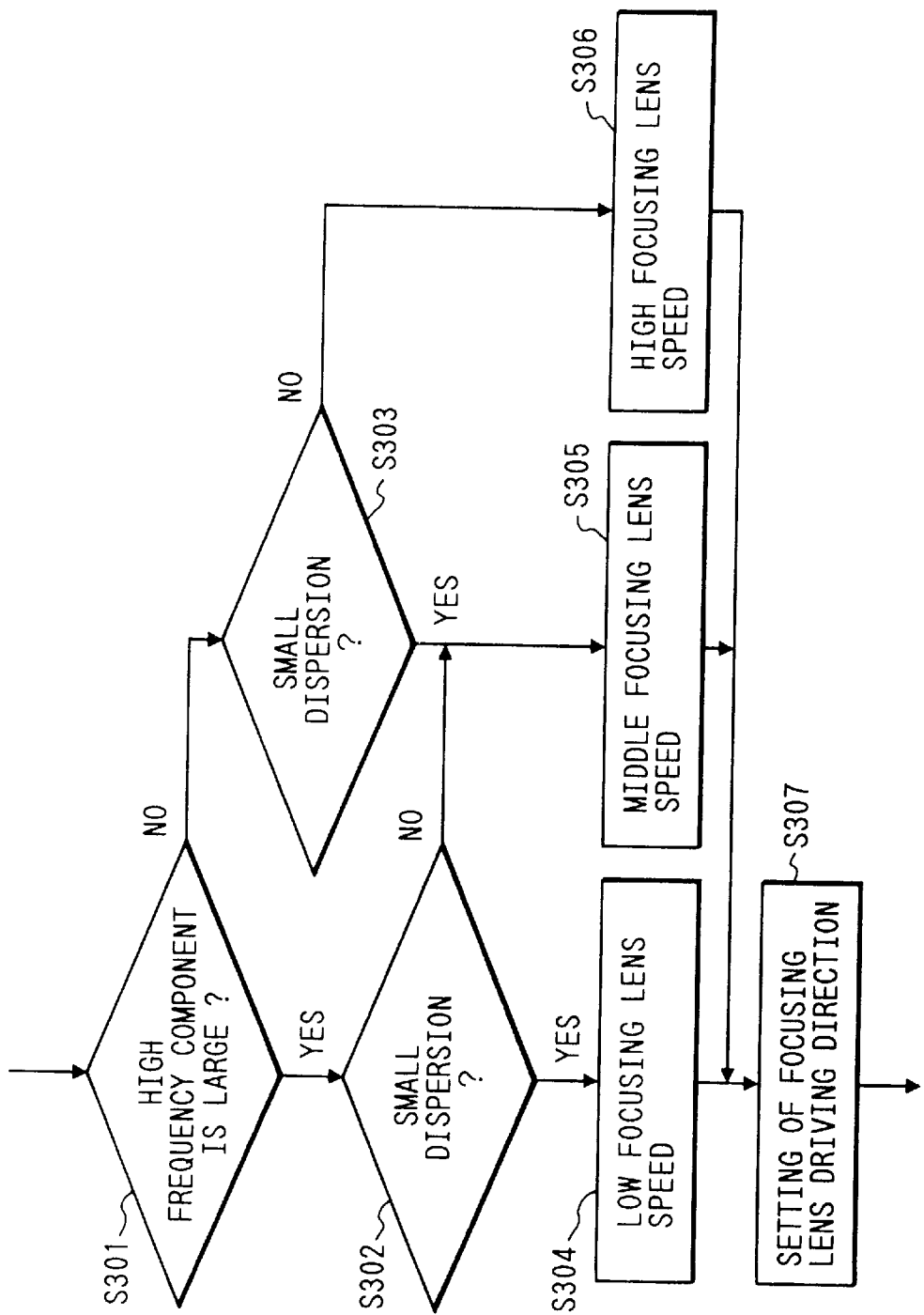

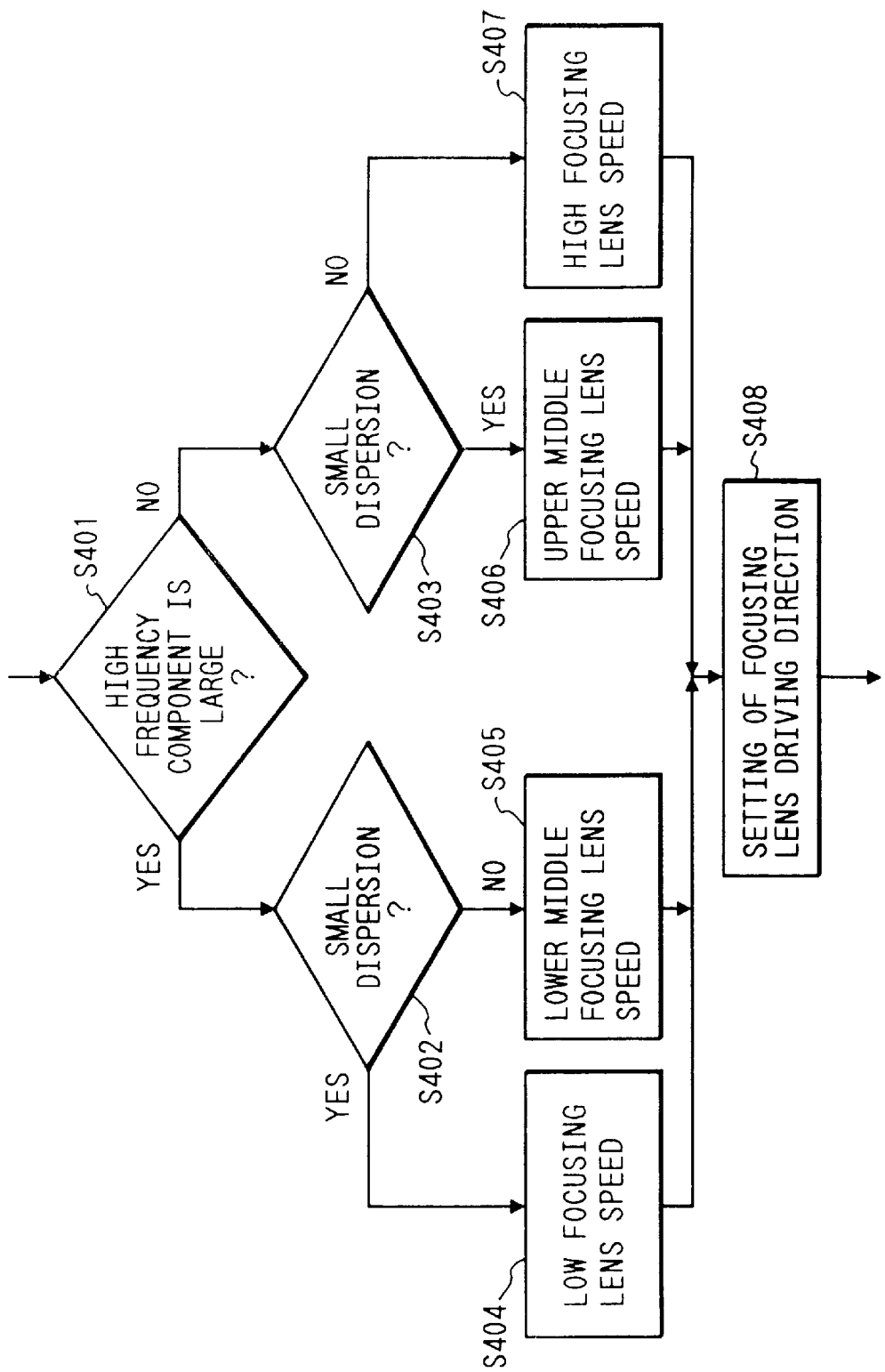

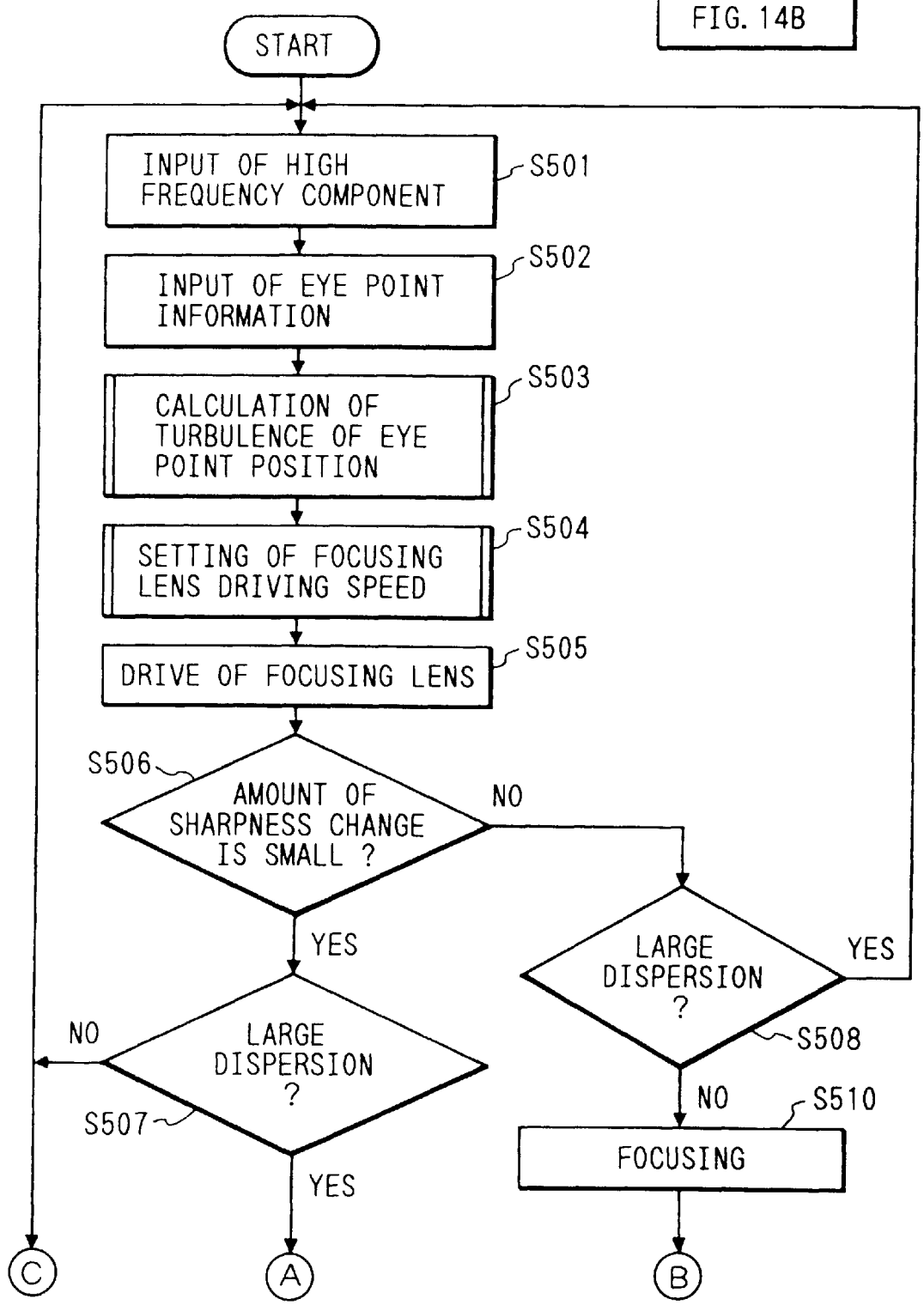

IMAGE PICKUP APPARATUS USING EYE POINT DISPERSION IN FOCUS CONTROL

This application is a division of application Ser. No. 08/490,515, filed Jun. 14, 1995 U.S. Pat. No. 5,594,500, which is a continuation of Ser. No. 07/959,680, filed Oct. 13, 1992, abandoned.

BACKGROUND OF THE INVENTION

1. Field of the Invention

The present invention relates to an image pickup apparatus using an eye point detection function of detecting an eye point of an operator in a frame.

2. Related Background Art

Conventionally, in the field of cameras, automated functions and multi-functions are used more often, and especially, a video camera has various functions such as an automatic exposure device, an automatic focus adjustment device, and the like as standard functions.

In particular, since an apparatus such as a video camera for picking up a dynamic image must keep focusing on an object which changes constantly, an automatic focus adjustment device is indispensable. However, the automatic focus adjustment device may often cause an erroneous operation, e.g., may be unfocused or may focus on an object other than an object of interest depending on an image pickup condition.

Thus, an automatic focus adjustment device using an eye point detector for detecting an eye point position of a user in a frame, setting a distance measurement frame at the coordinates of the eye point, and performing a focusing operation on the basis of a focus signal in the distance measurement frame has been proposed. However, when the eye point position changes too fast, and the position to be focused changes frequently, an unstable image which changes frequently is obtained, and the picked-up image may be degraded. When the size of the distance measurement frame is fixed, the eye point position cannot often be precisely focused. In this manner, various problems remain unsolved, and it is difficult to realize such a device. Note that U.S. Pat. Nos. 4,075,657, 4,109,145, 4,574,314, and the like are known as the patents associated with the eye point detector.

As for the automatic focus adjustment device, in particular, in the field of video cameras, the following technique is popular. That is, a signal corresponding to the amount of sharpness of an object image is extracted from a video signal output from, e.g., an image pickup element, and the position of a focusing lens is controlled to maximize the amount of sharpness, thereby focusing on the object.

The amount of sharpness is increased as the value of a high-frequency component in an image pickup frame is increased, and is detected on the basis of the magnitude of a high-frequency component of a video signal extracted by a band-pass filter, a blurred width magnitude (an evaluation value according to the reciprocal number of the width of an edge) of an edge portion extracted by a differential circuit, or the like. As for the blurred width detection magnitude upon a pickup operation of a normal object image, since the edge width of an object image is wide in an unfocusing state, the evaluation value is low. As the focusing lens approaches the focusing state, the edge width is decreased, and the evaluation value is increased. In the focusing state, since the edge width is minimized, the evaluation value is maximized.

By utilizing this nature, the focusing lens is driven as quickly as possible in a direction to increase the amount of sharpness. As the amount of sharpness is increased, the focusing lens is driven slowly, and is stopped with high precision at the top of the hill, thereby focusing on an object (such an automatic focus adjustment (AF) method is called a hill-climbing AF method).

However, in the above-mentioned example, since the speed of the focusing lens group is set according to the high-frequency component value by the hill-climbing AF method, the amount of sharpness and the dynamic range for an object vary considerably, and wrong driving control, focusing judgment, or reactivation judgment upon controlling of the focusing lens group may be made. As a result, the focusing lens group is stopped in an unfocusing state, or cannot be stopped at a focal point with high precision, thus causing so-called hunting.

SUMMARY OF THE INVENTION

The present invention has been made to solve the above-mentioned problems, and has as its first object to provide an image pickup apparatus, which can precisely and stably set a distance measurement frame at an eye point of a photographer in a frame, and can reliably focus on an object.

It is the second object of the present invention to provide an image pickup apparatus, which can pick up a dynamic image while stably and reliably focusing on a moving object.

In order to achieve these objects, according to a preferred aspect of the present invention, there is disclosed an image pickup apparatus for performing a focus adjustment operation on the basis of a signal within a distance measurement frame set on an image pickup frame, comprising detection means for detecting an eye point of a photographer in the image pickup frame, calculation means for calculating average coordinates of the eye point coordinates detected by the detection means, and setting means for setting a position of the distance measurement frame at the average coordinates output from the calculation means.

It is the third object of the present invention to provide an image pickup apparatus, which can realize optimal focus adjustment characteristics with respect to an object by changing the size of a distance measurement frame set at the eye point coordinates of a photographer according to an image pickup state.

In order to achieve the above object, according to another preferred aspect of the present invention, there is disclosed an image pickup apparatus for performing a focus adjustment operation on the basis of a signal within a distance measurement frame set on an image pickup frame, comprising detection means for detecting an eye point of a photographer in the image pickup frame, calculation means for calculating average coordinates of the eye point coordinates detected by the detection means, setting means for setting a position of the distance measurement frame at the average coordinates output from the calculation means, and control means for changing a size of the distance measurement frame set by the setting means according to an image pickup state.

It is the fourth object of the present invention to provide an image pickup apparatus, which can precisely recognize a focus state by detecting the eye point of a photographer, and can realize a stable focus adjustment operation with high precision.

It is the fifth object of the present invention to provide an image pickup apparatus, which can realize a precise focus adjustment operation regardless of the state of an object by analyzing a change in eye point of a photographer to discriminate a focus state.

In order to achieve the above object, according to still another preferred aspect of the present invention, there is disclosed an image pickup apparatus comprising first detection means for detecting a focus state of an object image formed on an image pickup frame, second detection means for detecting a dispersion of an eye point of a photographer on a detection frame corresponding to the image pickup frame, and control means for controlling the focus state using outputs from the first and second detection means.

In order to achieve the above object, according to still another preferred aspect of the present invention, there is disclosed an image pickup apparatus comprising focus detection means for detecting a focus state of an object image formed on an image pickup frame, drive means for driving a focusing lens on the basis of an output from the focus detection means, visual point detection means for detecting a dispersion i.e., a degree of speed, of an eye point of a photographer on a detection frame corresponding to the image pickup frame, and control means for controlling a driving speed of the focusing lens by the drive means on the basis of an output from the visual point detection means.

Other objects and features of the present invention will become apparent from the following specification and the accompanying drawings.

BRIEF DESCRIPTION OF THE DRAWINGS

FIG. 12 is a flow chart showing a focusing lens driving speed control operation in the second embodiment of the present invention;

FIG. 13 is a flow chart for explaining an operation of the third embodiment of the present invention.

DETAILED DESCRIPTION OF THE PREFERRED EMBODIMENTS

An embodiment wherein an image pickup apparatus according to the present invention is applied to a camera integrated type VTR (video tape recorder) will be described in detail hereinafter with reference to the accompanying drawings.

Figure 1:
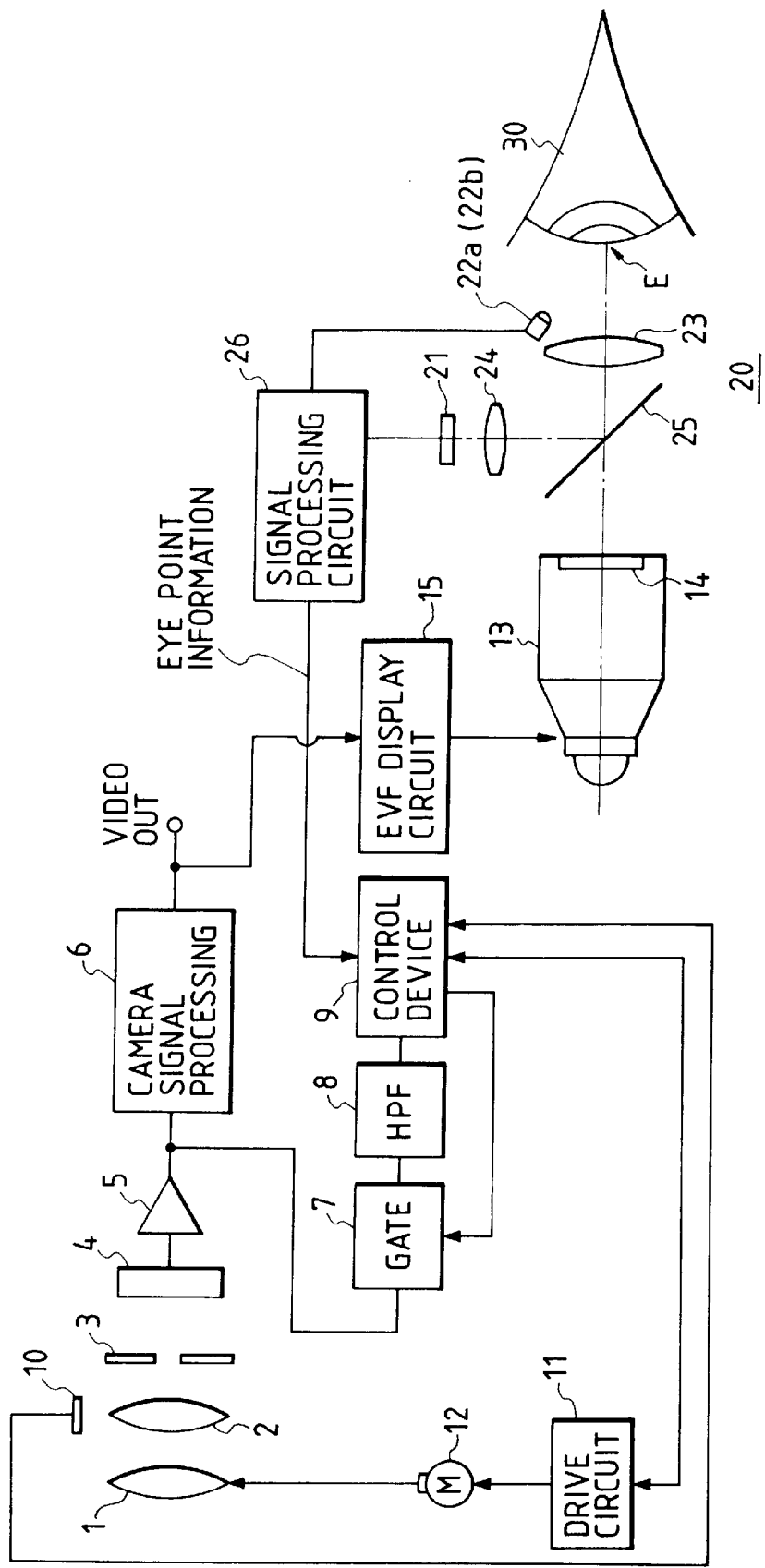
FIG. 1 is a block diagram showing the first embodiment of the present invention.

FIG. 1 is a block diagram showing an embodiment of a camera integrated type VTR adopting the present invention.

In FIG. 1, a visual line detection device 20 detects the visual line of a photographer, i.e., an eye point on a finder frame 14 of an electronic view finder 13, and is constituted by an optical system including a 1 photoelectric element array 21, an infrared light-emitting diode 22a (22b), an eyepiece lens 23, a light-receiving lens 24, and a dichroic mirror 25, and a signal processing circuit 26. Note that an eyeball of the photographer is designated by 30.

Infrared light is radiated onto the eyeball of the photographer by the infrared light-emitting diodes 22a and 22b, and light reflected by the eyeball is received on the photoelectric element array 21, thereby detecting which position the visual line of the photographer watches on the finder frame 14 of the electronic view finder 13, i.e., the eye point of the photographer.

The visual line detection device 20 will be described in detail below with reference to FIGS. 2 to 6.

The optical system is constituted by the dichroic mirror 25, the eyepiece lens 23, and the light-receiving lens 24. The dichroic mirror 25 transmits visible light therethrough, and reflects infrared light. That is, the dichroic mirror 25 transmits an optical image on the finder frame 14 of the electronic view finder 13 toward the eye of the photographer, and guides infrared light emitted from the infrared light-emitting diode and reflected by the eyeball toward the photoelectric element array 21. Light from the finder frame 14 is incident on the eyeball 30 through the dichromic mirror 25 and the eyepiece lens 24.

Figure 2:
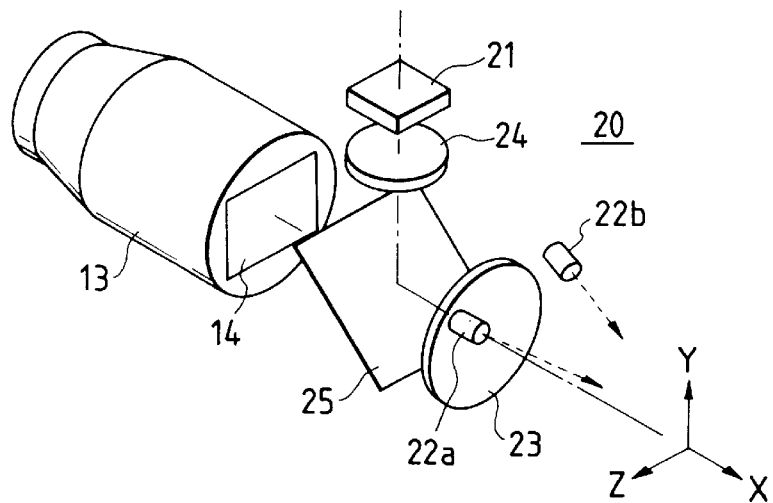
FIG. 2 is a perspective view showing an arrangement of an optical system 20 shown in FIG. 1.

The axis of light incident from the finder frame 14 onto an eye point E on the eyeball 30 is defined as an X-axis (see FIG. 2).

Figure 5:
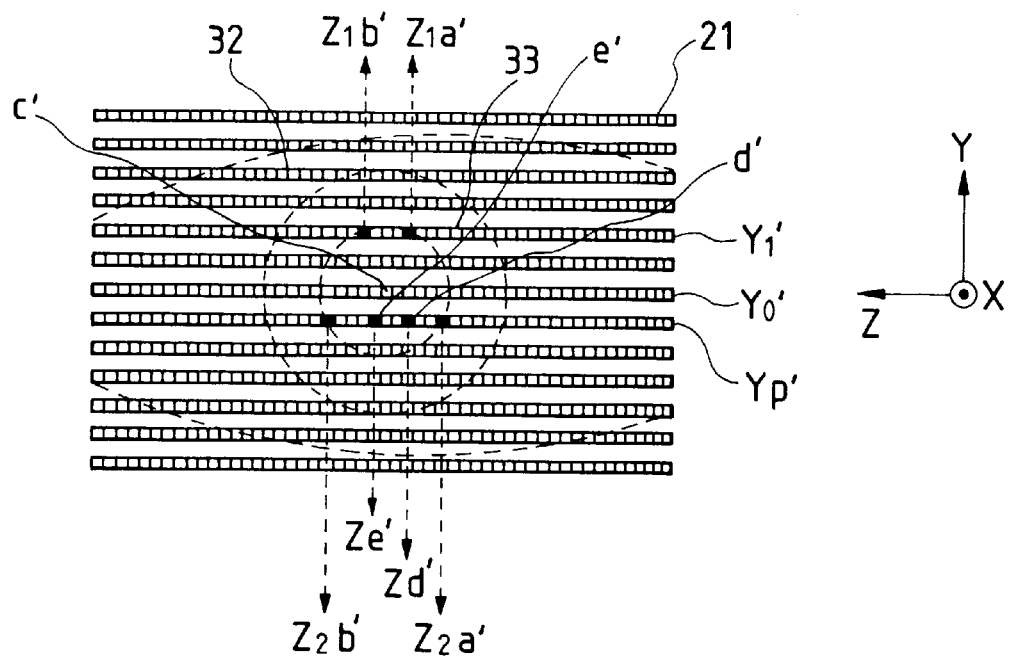
FIG. 5 is a view showing a reflection image from an eyeball.

The infrared light-emitting diodes 22a and 22b are arranged near the upper end portion, near the eyeball 30, of the eyepiece lens 23 to be symmetrical about the X-axis, SO that infrared light is incident on the center of the eyeball 30. The infrared light reflected by the eyeball 30 is transmitted through the eyepiece lens 23, is guided toward the light-receiving lens 24 by the dichroic mirror 25, and is incident on the photoelectric element array 21. FIG. 5 shows an example of an eyeball reflection image on the photoelectric element array 21. An axis perpendicular to the X-axis and parallel to the axis of light guided toward the light-receiving lens 24 by the dichroic mirror 25 and incident on the photoelectric element array 21 is defined as a Y-axis, and an axis perpendicular to a plane including the X- and Y-axes is defined as a Z-axis (see FIG. 2).

In the photoelectric element array 21, a plurality of photoelectric elements are aligned on a line parallel to the Z-axis.

The signal processing circuit 26 is constituted by an eyeball optical axis detection circuit, an eyeball discrimination circuit, a visual line correction circuit, an eye point detection circuit, and the like. The eyeball optical axis detection circuit obtains the rotational angle of the optical axis of the eyeball. The eyeball discrimination circuit discriminates whether an eyeball gazing at the finder frame 14 is a right or left eyeball. The visual line correction circuit corrects the visual line on the basis of the rotational angle of the optical axis of the eyeball, and the eyeball discrimination information. The eye point detection circuit calculates an eye point on the basis of an optical constant.

The arrangement of the camera section will be described below.

The camera section includes a focusing lens 1, a zoom lens 2, an aperture stop 3, an image pickup element 4 (e.g., a CCD) for converting an optical signal incident through the focusing lens 1, the zoom lens 2, and the aperture stop 3 into an electrical signal, a pre-amplifier 5 for amplifying the electrical signal from the image pickup element 4 to a predetermined level, a camera signal processing circuit 6 for performing predetermined signal processing of the signal output from the pre-amplifier 5 to convert the signal into a normalized video signal, and an EVF display circuit 15 for displaying the video signal output from the signal processing circuit on the electronic view finder 13.

The camera section also includes a motor 12 for moving the focusing lens 1, a drive circuit 11 for driving the motor 12, and a gate 7 for extracting only a signal corresponding to a portion inside a distance measurement frame to be subjected to a distanced measurement in the image pickup frame from the video signal output from the pre-amplifier 5, thereby varying the position and size of the distance measurement frame. The camera section further includes an HPF 8 for extracting a high-frequency component, which changes according to a focus state, of the signal in the distance measurement frame input from the pre-amplifier 5 through the gate 7, and a control device 9 for controlling the entire system, and for controlling the drive circuit 11 to maximize the high-frequency component from the HPF 8. The control device 9 controls the gate 7 on the basis of focal length information obtained based on the output from a zoom encoder 10, and eye point information from the signal processing circuit 26, thereby changing the position and size of the distance measurement frame.

Figure 7:
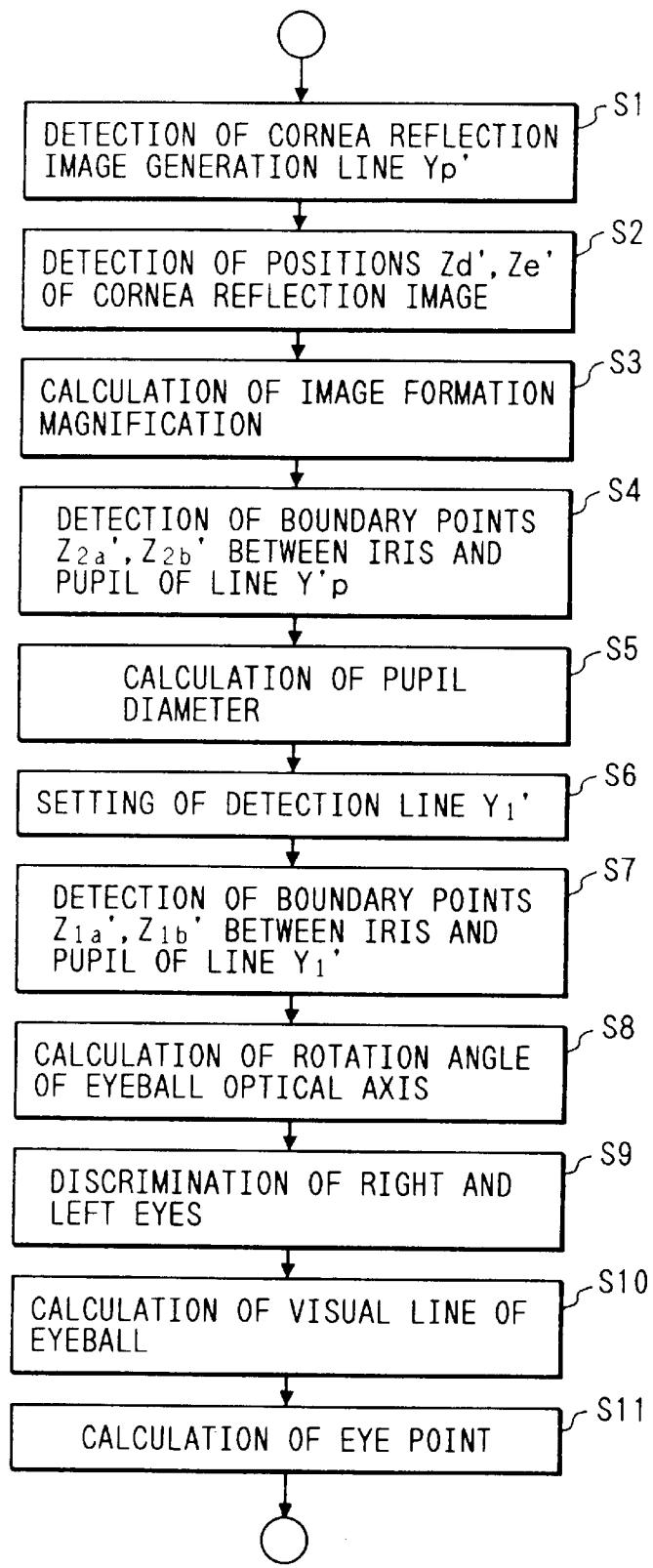
FIG. 7 is a flow chart showing a visual line detection processing sequence by a signal processing circuit 26.

FIG. 7 is a flow chart showing a visual line detection sequence by the signal processing circuit 9.

Figure 3:
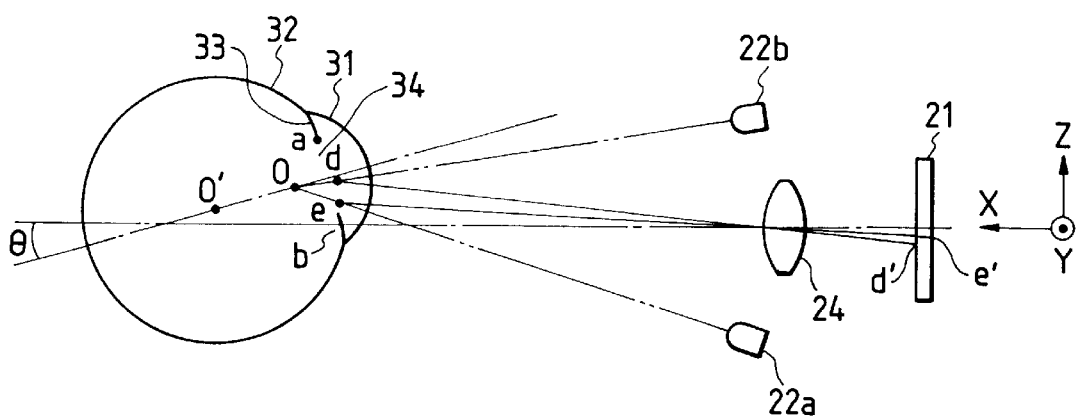
FIG. 3 is a view showing the position of a cornea reflection image on a plane including the X- and Z-axes.
Figure 4:
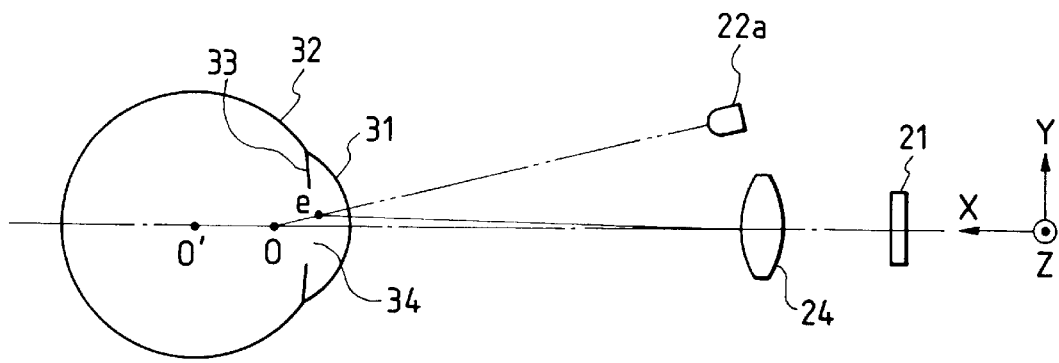
FIG. 4 is a view showing the position of a cornea reflection image on a plane including the X- and Y-axes.

Light beams from the infrared light-emitting diodes 22a and 22b respectively form cornea reflection images e and d of the eyeball in a direction parallel to the Z-axis (see FIG. 3). The Z-coordinate of the middle point between the cornea reflection images e and d coincides with the Z-coordinate of a center o of curvature of a cornea 31. When the optical axis of the eyeball of an observer is not pivoted about the Y-axis, i.e., when the optical axis of the eyeball coincides with the X-axis (the center o of curvature of the cornea and a center C' of a pupil are located on the X-axis), the cornea reflection image e (d) is formed to be shifted in the +Y direction from the X-axis (see FIG. 4).

Figure 6:
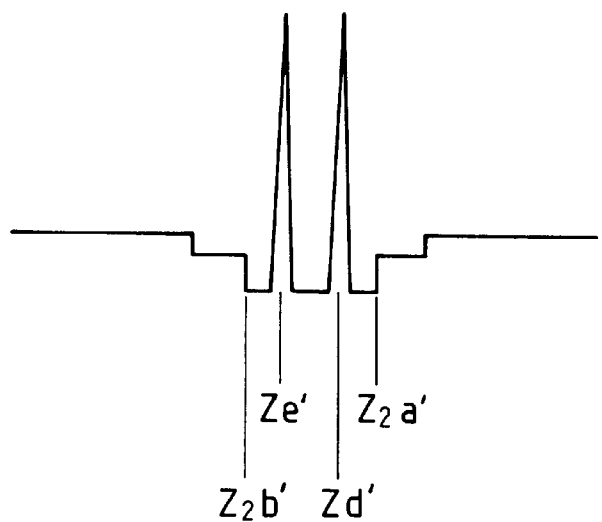
FIG. 6 is a chart showing an output signal obtained from a line Yp' of a photoelectric element array.

The rotational angle of the optical axis of the eyeball is detected by the eyeball optical axis detection circuit, and image signals from the photoelectric element array 21 are sequentially read from the −Y direction in FIG. 5. Thus, a line Yp' of the photoelectric element array 21 where cornea reflection images e' and d' are formed is detected (step S1), and generation positions Zd' and Ze' of the photoelectric element array 21 in the column direction where the cornea reflection images e' and d' are formed are detected (step S2). FIG. 6 shows an output signal detected from the line Yp' of the photoelectric element array 21. Then, an image formation magnification β of the optical system is calculated based on an interval |Zd'−Ze'| between the cornea reflection images (step S3). The image formation magnification β of the reflection images from the eyeball can be calculated by detecting the positions e' and d' of the cornea reflection images re-formed on the photoelectric element array 21 since the interval between the cornea reflection images e and d changes in proportion to the distance between the infrared light-emitting diodes 22a and 22b and the eyeball of the observer. Boundary points Z2b' and Z2a' between an iris 33 and a pupil 34 on the line Yp' of the photoelectric element array 21 on which the cornea reflection images e and d are re-formed are detected (step S4), thus calculating a pupil diameter |Z2b'−Z2a'| on the line Yp' (step S5).

Normally, as shown in FIG. 5, the line Yp' of the photoelectric element array 21 on which the cornea reflection images are formed is shifted, from a line Yo' of the photoelectric element array 21 where the center C' of the pupil is present, in the −Y direction, in FIG. 5. Another line Y1' of the photoelectric element array from which image signals are to be read is calculated on the basis of the image formation magnification β and the pupil diameter (step S6). The line Y1' is sufficiently separated from the line Yp'. Then, boundary points Z1b' and Z1a' between the iris 33 and the pupil 34 on the line Y1' of the photoelectric element array are detected (step S7). The central position C' (Zc', Yc') of the pupil is calculated using at least three of the boundary point (Z1a', Y1'), the boundary point (Z1b', Y1'), the boundary point (Z2a', Yp'), and the boundary point (Z2b', Yp').

Then, rotational angles θz and θy of the optical axis of the eyeball are calculated based on the positions (Zd', Yp') and (Ze', Yp') of the cornea reflection images and the following formulas (1) and (2) (step S8):

$$\beta * \overline{OC} * \sin\theta z \simeq Zc' - (Zd' + Ze')/2 \qquad (1)$$

$$\beta * \overline{OC} * \sin\theta y \simeq Yc' - Yp' + \delta Y' \qquad (2)$$

where δY' is the correction value for correcting shifts, in the Y-axis direction, of the re-formation positions of the cornea reflection images from the Y-coordinate of the center of curvature of the cornea 31 on the photoelectric element array 21 since the infrared light-emitting diodes 22a and 22b are arranged in a direction perpendicular to the column direction of the photoelectric element array 21 with respect to the light-receiving lens 24.

The eyeball discrimination circuit discriminates based on, e.g., the distribution of the calculated rotational angle of the optical axis of the eyeball whether the eye of the observer viewing the finder is the right or left eye (step S9). The correction circuit corrects the visual line on the basis of the eyeball discrimination information and the rotational angles of the optical axis of the eyeball (step S10). The eye point is calculated on the basis of the optical constant of the optical system (step S11).

Figure 8:
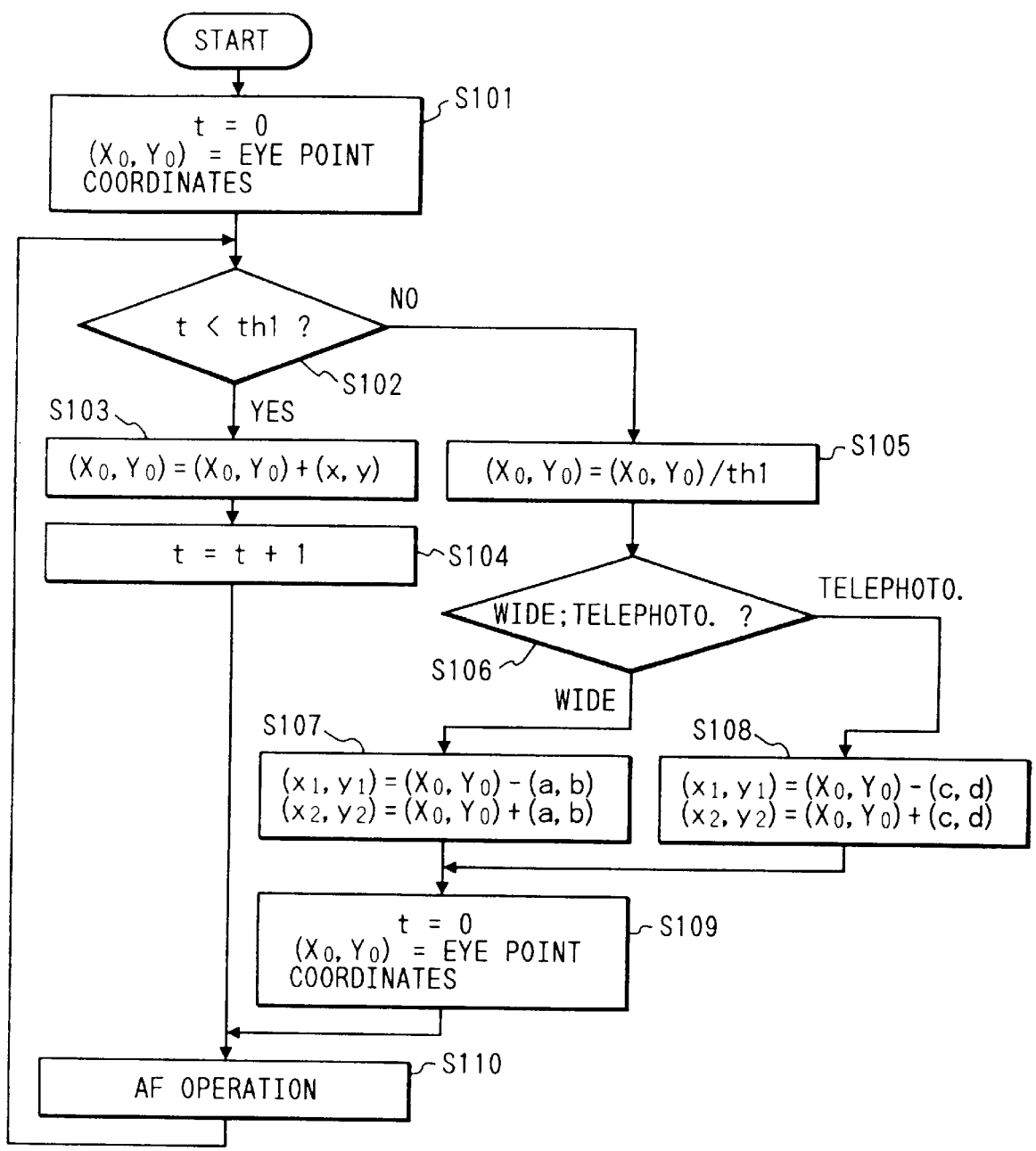
FIG. 8 is a flow chart showing a control sequence by a control device 9 shown in FIG. 1.

FIG. 8 is a flow chart showing a control sequence by the control device shown in FIG. 1.

In step S101, a time t is set to be t=0, and the X- and Y-coordinates of the eye point information at that time are set to be (X0, Y0). In step S102, it is checked if the time t is shorter than a predetermined time th1. If YES in step S102, the flow advances to step S103 to set (X0, Y0)=(X0, Y0)+(x, y). In this case, (x, y) represents the eye point coordinates at this time. In step S104, t=t+1, and in step S110, an AF operation is performed. Thereafter, the flow returns to step S102.

Figure 9:
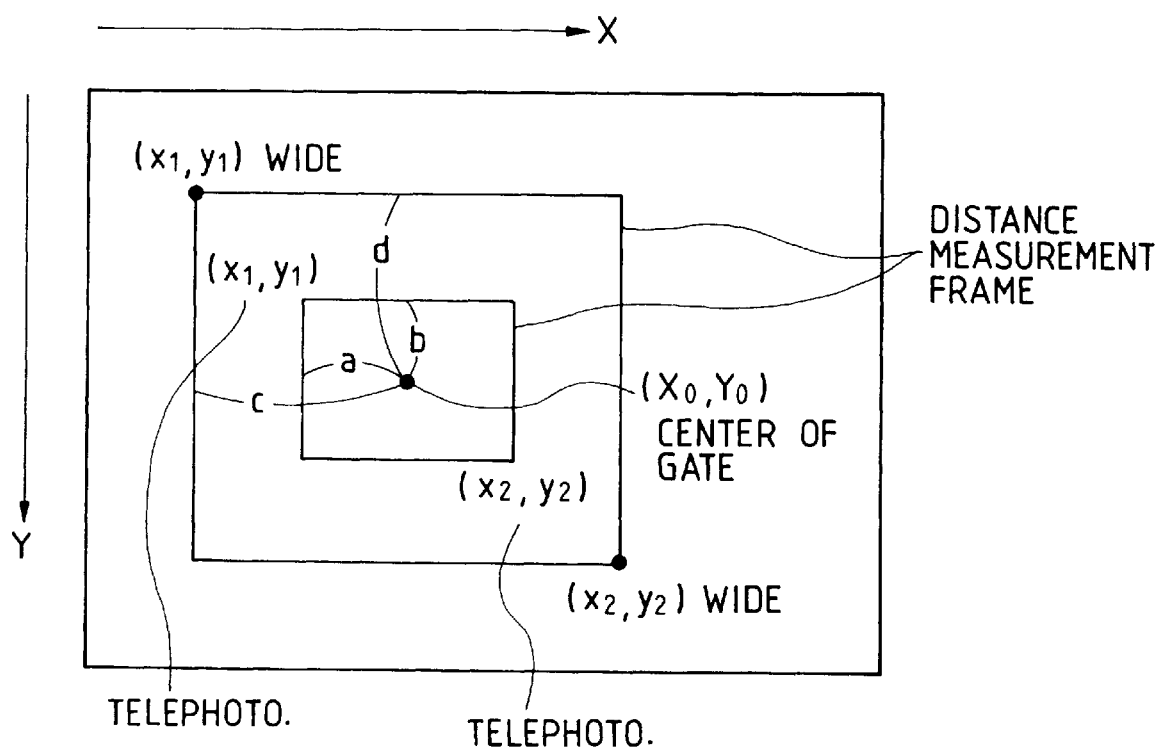
FIG. 9 is a view showing a distance measurement frame to be set.

If it is determined in step S102 that the time t is not shorter than the predetermined time th1, the flow advances to step S105 to calculate an average value of the eye point information for the predetermined time th1, i.e., (X0, Y0)=(X0, Y0)/th1. The distance measurement frame is set at the calculated coordinates (X0, Y0), and the calculated coordinates are input as the central value of the gate 7. In step S106, it is checked if a focal length is a wide or telephoto side. If it is determined in step S106 that the focal length is the wide side, a large frame shown in FIG. 9 is set in step S107. Coordinates $(x_1, y_1)$ and $(x_2, y_2)$ of this frame are given by:

$(x_1, y_1)=(X0, Y0)-(a, b)$ $(x_2, y_2)=(X0, Y0)+(a, b)$

If it is determined in step S106 that the focal length is the telephoto side, a small frame shown in FIG. 9 is set in step S107. Coordinates $(x_1, y_1)$ and $(x_2, y_2)$ of this frame are given by:

$$(x_1, y_2)=(X0, Y0)-(c, d)$$

$$(x_2, y_2)=(X0, Y0)+(c, d)$$

After the frame is set, the time t is set to be 0, and new coordinates of the eye point are read in step S109. The gate 7 is controlled based on the calculated frame coordinates. Thereafter, the flow advances to step S110.

In this embodiment, as information upon control of the gate 7, the eye point coordinates and the focal length are used, and the focal length is divided into two stages. However, the number of divisions of the focal length may be increased. In this case, the number of sizes of the distance measurement frames can be increased, and the position and size of the distance measurement frame can be set in correspondence with image information.

As described above, the average value point is calculated, the distance measurement frame is set at the calculated average eye point, and the size of the set distance measurement frame is controlled according to the focal length, thus realizing a precise and smooth focusing operation.

According to the embodiment described above, when the distance measurement frame is set in the image pickup frame, the visual line, i.e., the eye point of the photographer with respect to the image pickup frame is detected, and the average coordinates of the eye point are calculated to determine the position of the distance measurement frame. Thus, the distance measurement frame can be stabilized, and the AF performance can be improved.

In the second embodiment of the present invention to be described below, the eye point of the photographer is detected, and the drive operation of the focusing lens is controlled using the detected eye point as one information for discriminating the focus state, thus allowing a precise and quick focus adjustment operation free from an erroneous operation.

More specifically, the amount of sharpness of an object image is detected on the basis of an electrical signal from a photoelectric conversion means, and the dispersion of the eye point in the finder frame of the view finder is detected. The driving speed of the focusing lens is controlled as follows. That is, the maximum driving speed is set when the dispersion of the eye point is maximum, and the amount of sharpness is the smallest. As the dispersion of the eye point is decreased, and the amount of sharpness is increased, the driving speed is decreased. The second embodiment will be described in detail below.

Figure 10:
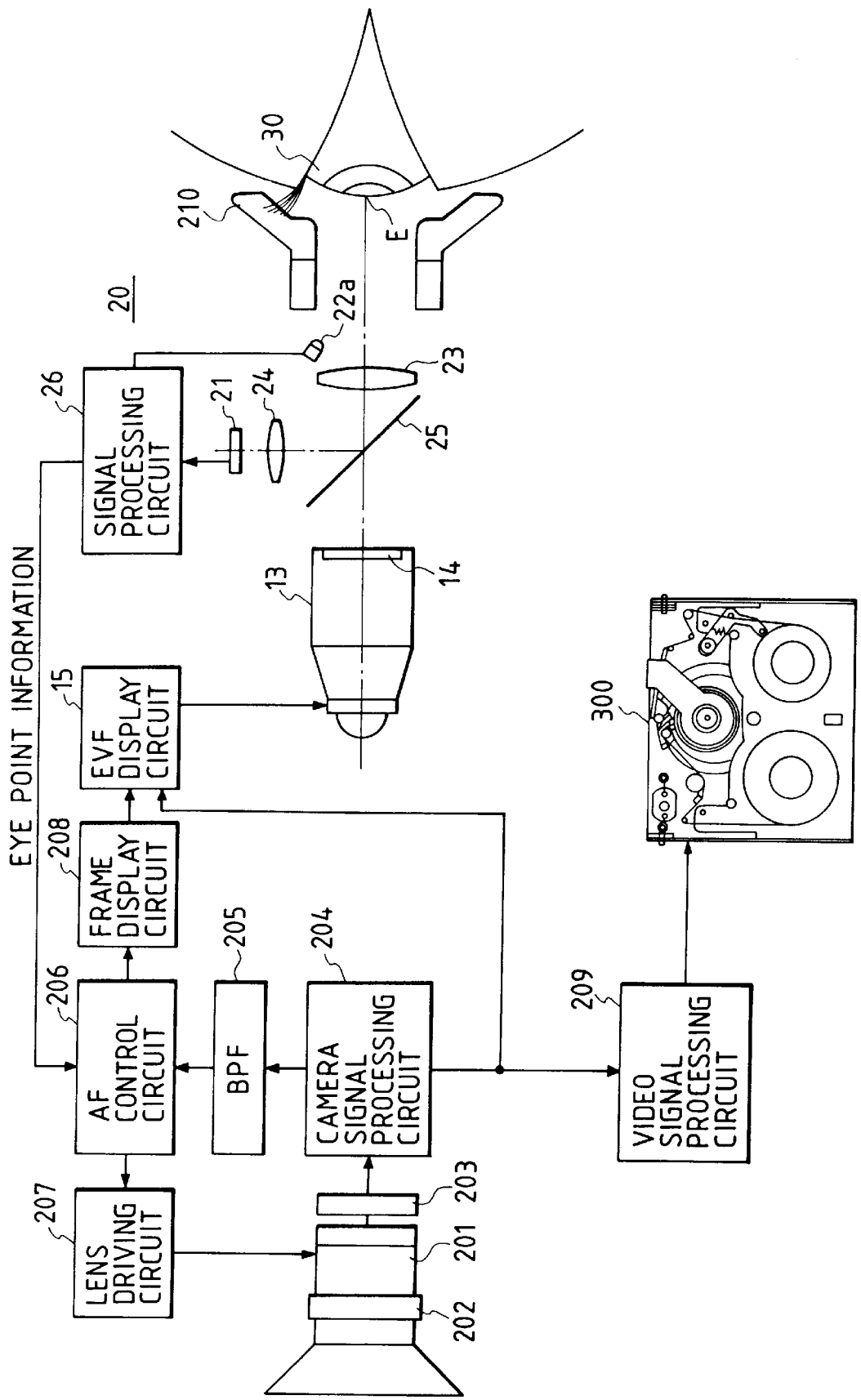
FIG. 10 is a block diagram showing the second embodiment of the present invention.

FIG. 10 is a block diagram showing the second embodiment of the present invention.

In FIG. 10, the arrangement of a visual line detection device 20 is the same as that in the first embodiment shown in FIG. 1. The same reference numerals in FIG. 10 denote the same parts as in FIG. 1, and a detailed description thereof will be omitted.

A camera section shown in FIG. 10 includes a focusing lens group 201, a zooming lens group 202, an image pickup element 203 for photoelectrically converting an object image incident through an optical system including the focusing lens group 201 and the zooming lens group 202, and outputting an image pickup signal, and a camera signal processing circuit 204 for performing predetermined signal processing of the image pickup signal output from the image pickup element 203 to convert it into a normalized video signal.

The camera section also includes a band-pass filter 205 for extracting a high-frequency component, which changes according to a focus state, and represents the amount of sharpness of the object image, from the video signal obtained from the camera signal processing circuit 204, and an AF control circuit 206 for detecting the amount of sharpness on the basis of the high-frequency component in the video signal extracted by the band-pass filter 205, and controlling a lens drive circuit 207 using information representing the dispersion of an eye point detected by a signal processing circuit 26 in the visual line detection device, as will be described later, so as to control the driving speed of the focusing lens. More specifically, as will be described later, the AF control circuit 206 performs the following control operation. That is, the maximum moving speed of the focusing lens group 201 is set when the dispersion of the eye point is maximum and the amount of sharpness is the smallest, and the moving speed is decreased as the dispersion of the eye point is decreased and the amount of sharpness is increased.

The camera section further includes a frame display circuit 208 for displaying the position and range of a distance measurement frame determined by the AF control circuit on a finder frame 14, and an EVF display circuit 15 for synthesizing distance measurement frame information output from the frame display circuit 208, and the video signal output from the camera signal processing circuit 204, supplying the synthesized signal to an electronic view finder 13, and displaying the signal on the frame 14.

The camera section further includes a video signal processing circuit 209 for converting the video signal output from the camera signal processing circuit 204 into a format suitable for recording in a recording/reproduction device such as a video tape recorder, and a video tape recorder (VTR) 300 for recording the video signal output from the video signal processing circuit 209 on a recording medium such as a magnetic tape. Note that an eye cup is designated by 210 in FIG. 10.

AF control processing in this embodiment will be described below. The visual line detection operation of the visual line detection device 20 is the same as that in the first embodiment, as shown in FIGS. 2 to 7. The information of the eye point coordinates output from the signal processing circuit 26 of the visual line detection device 20 is supplied to the AF control. circuit 206, and is used in control of the focusing lens together with information representing the amount of sharpness of the object image output from the band-pass filter 205.

The technical principle of this embodiment will be briefly explained below. More specifically, when an object image to be picked up is focused, a photographer observes the central portion of the object image, and it is presumed that an average dispersion of the visual line is small. For example, when an image of a person to be picked up is focused, it is presumed that the photographer normally watches the face of the person.

However, when an object image is in an unfocusing state, since a photographer cannot precisely recognize the object image, it is presumed that his or her eye point frequently changes to the edge portion and the central portion of the object image, and the dispersion is increased. Therefore, when the dispersion is evaluated, it can become very effective information for determining the degree of blur of the object image. When this information is used together with the information representing the amount of sharpness for detecting the focus state, precise focusing lens driving control free from the influence of the size and shape of the object image can be attained.

Based on this principle, according to this embodiment, the degree of blur of the object image is estimated on the basis of the information representing the dispersion of the eye point of the photographer on the frame and the information representing the amount of sharpness, thereby controlling the driving speed of the focusing lens.

Figure 11:
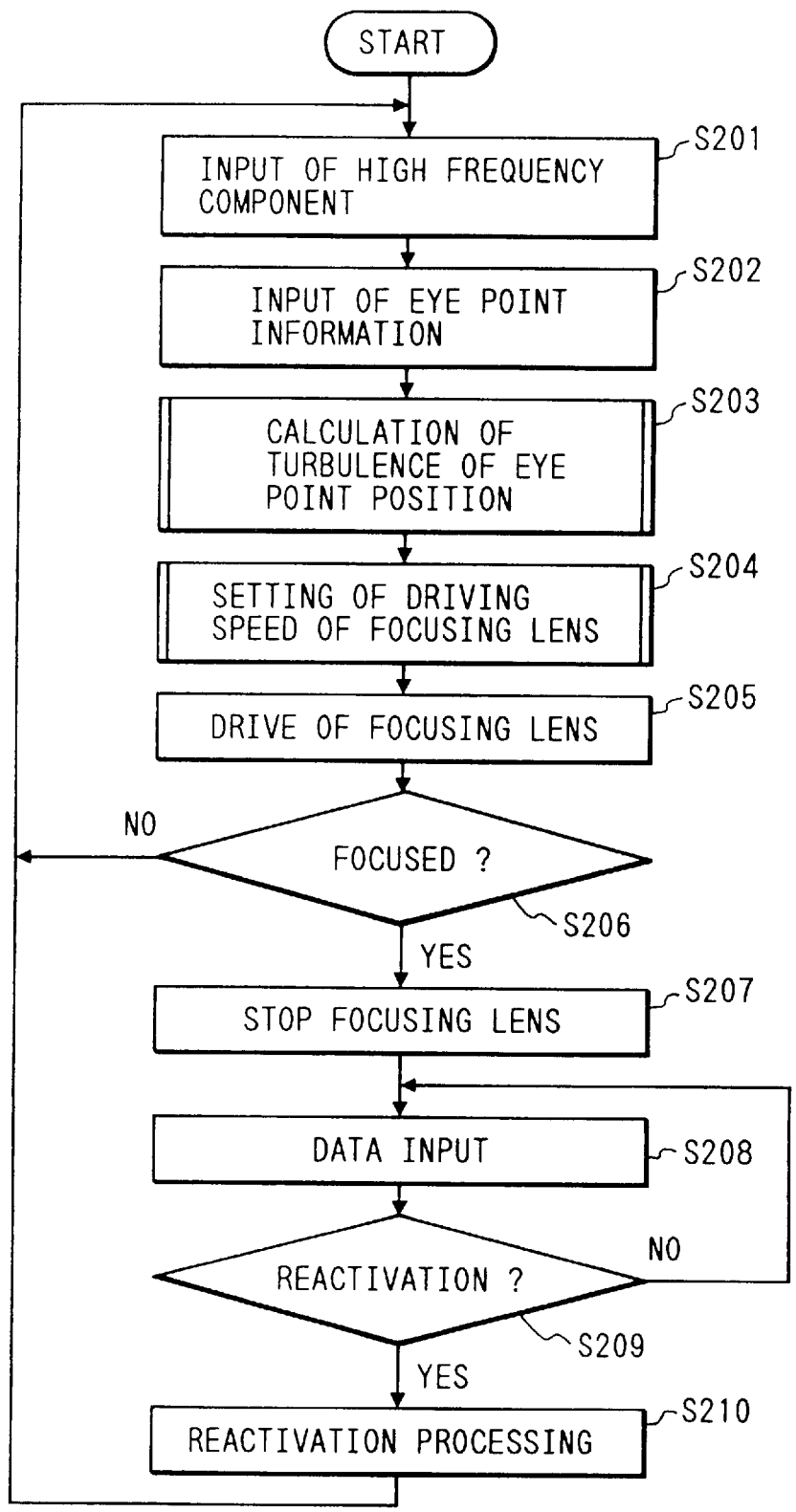
FIG. 11 is a flow chart for explaining an operation of the second embodiment of the present invention.

FIG. 11 is a flow chart showing a control sequence by the AF control circuit 206 shown in FIG. 10.

When the high-frequency component of the video signal is input from the band-pass filter 205, the high-frequency component is A/D-converted in step S201, and is fetched in units of fields. In step S202, the eye point information obtained from the signal processing circuit 26, i.e., the position coordinate value (eye point coordinate value) on the finder frame 14 where the photographer currently gazes is received. In step S203, a dispersion (turbulence) TL of the eye point coordinate value is calculated by the following equation:

$$TL = \frac{\sqrt{\frac{(IPxm - IPxi)^2 + (IPym - IPyi)^2}{2}}}{\sqrt{IPxm^2 + IPym^2}} \quad (3)$$

where IPxm and IPym are the average values of movements of the eye point coordinates in the X- and Y-directions, and IPxi and IPyi are the current X- and Y-components of the eye point coordinates.

In step S204, the driving speed of the focusing lens group 201 is set on the basis of the high-frequency component and the dispersion TL of the eye point coordinates. In step S205, the focusing lens group 201 is driven by a motor (not shown) through the lens drive circuit 207 on the basis of the set driving speed.

In step S206, it is checked based on a change in high-frequency component extracted value if a focusing state is attained. If NO in step S206, the flow returns to step S201, and steps S201 to S206 are repeated. However, if YES in step S206, the flow advances to step S207, and the driving operation of the motor for driving the focusing lens group 201 is stopped to stop the movement of the focusing lens group 201. In step S208, data used in the following reactivation judgment is input, and the movement of the focusing lens group 201 is stopped. Thereafter, in step S209, it is checked based on a decrease in high-frequency component extracted value whether or not the object or the like moves, and the focusing state cannot be maintained. If it is determined in step S209 that reactivation is needed, reactivation processing is executed in step S210, and the flow returns to step S201.

FIG. 12 is a flow chart showing the details of the control sequence in step S204 in FIG. 11.

In step S301, it is checked if a high-frequency component value TH is larger than a threshold value TH1. If YES in step S301, it is checked in step S302 if the dispersion of the eye point position is small. If YES in step S302, the driving speed of the focusing lens group 201 is set to be a minimum value in step S304; otherwise, the driving speed of the focusing lens group 201 is set to be a middle value in step S305. In step S307, the driving direction of the focusing lens is set.

On the other hand, if it is determined in step S301 that the high-frequency component value TH is larger than the threshold value TH, it is checked in step S303 if the dispersion of the eye point position is small. If YES in step S303, the driving speed of the focusing lens group 201 is set to be a middle value in step S305; otherwise, the driving speed of the focusing lens group 201 is set to be a maximum value in step S306. The flow then advances to step S307.

The third embodiment of the present invention will be described below with reference to the flow chart shown in FIG. 13.

Upon comparison with the second embodiment of the present invention, this embodiment has a control sequence different from the control sequence in step S204 in FIG. 11.

In the second embodiment described above, the driving speed of the focusing lens is set in three stages, i.e., the minimum value, middle value, and maximum value. However, in this embodiment, the driving speed is set in four stages, i.e., the minimum value, lower middle value, upper middle value, and maximum value.

FIG. 13 is a flow chart showing a control sequence of processing executed in step S204 shown in FIG. 11 in this embodiment.

In step S401, it is checked if a high-frequency component value TH is larger than a threshold value TH1. If YES in step S401, it is checked in step S402 if the dispersion of the eye point position is small. If YES in step S402, the driving speed of the focusing lens group 201 is set to be a minimum value in step S404; otherwise, the driving speed of the focusing lens group 201 is set to be a lower middle value in step S405. In step S408, the driving direction of the focusing lens group 201 is set.

On the other hand, if it is determined in step S401 that the high-frequency component value TH is smaller than the threshold value TH1, it is checked in step S403 if the dispersion of the eye point position is small. If YES in step S403, the driving speed of the focusing lens group 201 is set to be an upper middle value in step S406; otherwise, the driving speed of the focusing lens group 201 is set to be a maximum value in step S407. Thereafter, the flow advances to step S408.

As described above, according to this embodiment, the amount of sharpness is detected on the basis of an electrical signal from a photoelectric conversion means, and the dispersion of the eye point in the finder frame of the view finder upon detection of the amount of sharpness is detected. The moving speed of the focusing lens group is set to be a maximum value when the dispersion of the eye point is maximum and the amount of sharpness is the smallest. As the dispersion of the eye point is decreased, and the amount of sharpness is increased, the moving speed is decreased. Therefore, a precise and smooth focusing operation can be performed.

The fourth embodiment of the present invention will be described below. According to the above embodiments, the eye point of a photographer in a finder frame is detected, and the dispersion of the eye point is calculated, and is used in driving speed control of the focusing lens. However, a focusing/unfocusing state may be discriminated using the information representing the dispersion of the eye point. The fourth embodiment embodies this method.

The circuit arrangement, detection of the eye point, and calculation for quantifying the dispersion of the eye point are the same as those in the embodiments shown in FIGS. 7 and 10.

According to this embodiment, when the quantified dispersion of the eye point is large, and a change in amount of sharpness is small, an unfocusing state is determined; when the dispersion of the eye point is small, and the change in amount of sharpness is large, a focusing state is determined.

Figure 14B:
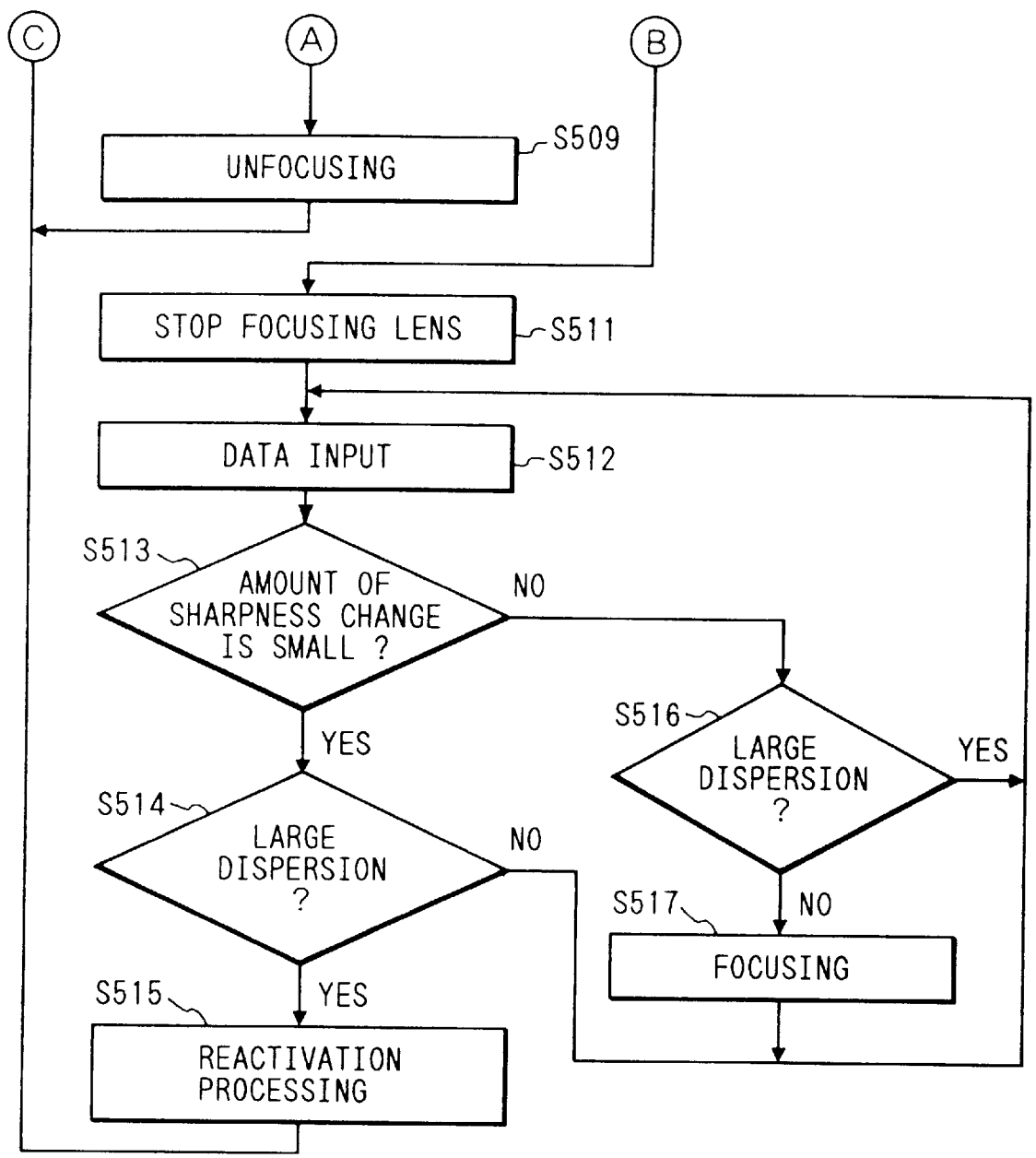
FIG. 14 is a flow chart for explaining an operation of the fourth embodiment of the present invention.

FIG. 14 is a flow chart for explaining a control processing sequence of this embodiment.

When the high-frequency component of a video signal is input from the band-pass filter 205, the high-frequency component is A/D-converted in step S501, and is fetched in units of fields. In step S502, the eye point information obtained from the signal processing circuit 26, i.e., the position coordinate value (eye point coordinate value) on a finder frame 14 where the photographer currently gazes is received. In step S503, the dispersion TL of the eye point coordinate value is calculated by the above-mentioned equation (3).

In step S504, the driving speed of the focusing lens group 201 is set on the basis of the high-frequency component extracted value. In step S505, the focusing lens group 201 is driven by a motor (not shown) through the lens drive circuit 207 on the basis of the set driving speed.

In step S506, it is checked based on a change in high-frequency component extracted value and the dispersion TL of the eye point coordinate value if a focusing state is attained.

More specifically, in step S506, it is checked if an amount DS of sharpness change is larger than a predetermined threshold value TH1. If it is determined in step S506 that the amount DS of sharpness change is smaller than the threshold value TH1, the flow advances to step S507 to check if the dispersion TL of the eye point coordinate position is larger than a predetermined threshold value. If YES in step S507, an unfocusing state is determined in step S509 since the frame is blurred and the object to be watched is not easy to see. The flow then returns to step S501 to continue the focus adjustment operation.

If it is determined in step S507 that the dispersion is small, it is difficult to specify whether the object image is blurred or small, or the entire frame has a low contrast, and the current state is maintained. Therefore, in this case, since the focus adjustment operation is being performed, the flow returns to step S501 to continue the focus adjustment operation.

If it is determined in step S506 that the amount DS of sharpness change is larger than the threshold value TH1, the flow advances to step S508 to check if the dispersion TL of the eye point coordinate position is large. If NO in step S508, the flow advances to step S510, and a focusing state is determined since the amount of sharpness change is sufficiently large and an object image to be watched can be clearly seen. The flow then advances to step S511, and the focusing lens is stopped. If it is determined in step S508 that the dispersion is large, focusing/unfocusing judgment is not performed, and the current state is maintained since the eye point is not stable although the amount of sharpness is large. Therefore, the flow returns to step S501.

After the focusing lens group 201 is stopped in step S511, the control enters a reactivation judgment routine in steps S512 to S517.

In step S512, data used in reactivation judgment is input, and the movement of the focusing lens group 201 is stopped. Thereafter, it is checked according to a decrease in amount of sharpness based on the high-frequency component and the dispersion TL of the eye point coordinates whether or not an object moves, and the focusing state cannot be maintained.

More specifically, after the data for reactivation is input in step S512, the amount DS of sharpness change is compared with a predetermined reactivation threshold value TH2 in step S513. If the amount of change is equal to or smaller than the threshold value TH2, and it is determined in step S514 that the dispersion of the eye point is large, it is determined that the object moves and falls outside the focusing state. Thus, the flow advances to step S515, and reactivation processing is performed. The flow returns to step S501 to reactivate the focusing lens.

If it is determined in step S513 that the amount DS of sharpness change is larger than the threshold value TH2, the flow advances to step S516 to check if the dispersion of the eye point coordinates is large. If NO in step S516, a focusing state is determined in step S517, and the flow returns to step S512 to prepare for the next reactivation. If it is determined in step S516 that the dispersion is large, an unfocusing state cannot be determined, and it may be that a photographer is merely watching the entire frame. Therefore, the current state is maintained, and the flow returns to step S512.

The above-mentioned operations are repetitively executed.

More specifically, in this embodiment, the information representing the dispersion of the eye point is combined with the information representing the amount of sharpness. When the dispersion of the eye point is large, and a change in amount of sharpness is small, an unfocusing state is determined; when the dispersion of the eye point is small, and a change in amount of sharpness is large, a focusing state is determined. Thus, a precise focusing judgment operation and reactivation judgment operation can be realized.

What is claimed is:

1. An image pickup apparatus comprising:
    (A) first detection means for detecting a focus state of an object image formed on an image pickup frame;
    (B) second detection means for detecting a relationship between an eye point of a photographer and an average eye point of said photographer on a detection frame corresponding to the image pickup frame; and
    (C) control means for controlling the focus state using outputs from said first and second detection means.

2. An apparatus according to claim 1, wherein the image pickup frame is an image pickup frame of image pickup means for photoelectrically converting the object image, and outputting an image pickup signal, and said first detection means detects the focus state on the basis of a predetermined signal component, which changes in accordance with the focus state, in the image pickup signal.

3. An apparatus according to claim 2, wherein the predetermined signal component is a high-frequency component in the image pickup signal.

4. An apparatus according to claim 1, wherein said second detection means comprises a light-emitting element for radiating infrared light into an eyeball of the photographer, a light-receiving element for receiving light emitted from said light-emitting element and reflected by the eyeball, and a signal processing circuit for calculating position coordinates of the eye point of the photographer on the image pickup frame on the basis of a light-receiving position of the reflected light on said light-receiving element.

5. An apparatus according to claim 4, wherein said light-emitting element and said light-receiving element of said second detection means are built in a view finder, and the detection frame corresponds to a light-receiving surface of said light-receiving element.

6. An apparatus according to claim 1, wherein said control means performs focusing/unfocusing judgment and reactivation judgment on the basis of the output from said first detection means, and controls a driving speed of a focusing lens using information from said second detection means.

7. An apparatus according to claim 6, wherein said control means increases the driving speed of the focusing lens as the amount of sharpness detected by said first detection means is smaller and the relationship between the eye point of the photographer and an average eye point of the photographer detected by said second detection means is larger, and decreases the driving speed of the focusing lens as the amount of sharpness is larger and the relationship between the eye point of the photographer and an average eye point of the photographer detected by said second detection means is smaller.

8. An apparatus according to claim 1, wherein said control means performs focusing/unfocusing judgment using the outputs from said first and second detection means.

9. An apparatus according to claim 1, wherein said control means performs reactivation judgment after focusing using the outputs from said first and second detection means.

10. An apparatus according to claim 1, wherein said control means controls a focus adjustment speed using the outputs from said first and second detection means.

11. An apparatus according to claim 1, wherein said second detection means comprises means for detecting a frequency of eye point change of a user of the apparatus.

12. An image pickup apparatus comprising:
 (A) focus detection means for detecting a focus state of an object image formed on an image pickup frame;
 (B) drive means for driving a focusing lens on the basis of an output from said focus detection means;
 (C) visual point detection means for detecting a dispersion of an eye point of a photographer on a detection frame corresponding to the image pickup frame; and
 (D) control means for controlling a driving speed of said focusing lens by said drive means on the basis of an output from said visual point detection means.

13. An apparatus according to claim 12, wherein said visual point detection means comprises a light-emitting element for radiating infrared light into an eyeball of the photographer, a light-receiving element for receiving light emitted from said light-emitting element and reflected by the eyeball, and a signal processing circuit for calculating position coordinates of the eye point of the photographer on the image pickup frame on the basis of a light-receiving position of the reflected light on said light-receiving element.

14. An apparatus according to claim 13, wherein said light-emitting element and said light-receiving element of said second detection means are built in a view finder, and the detection frame corresponds to a light-receiving surface of said light-receiving element.

15. An apparatus according to claim 12, wherein said control means increases the driving speed of said focusing lens as the dispersion of the eye point is larger, and decreases the driving speed of said focusing lens as the dispersion of the eye point is smaller.

16. A focus control apparatus comprising:
 (A) first detection means for detecting a focus state of an object image formed on an image screen;
 (B) second detection means for detecting a relationship between an eye point of a photographer and an average eye point of said photographer on the image screen, and
 (C) control means for controlling the focus state using outputs from said first and second detection means.

17. An apparatus according to claim 16, wherein the image screen is an image pickup plane of image pickup means for photoelectrically converting the object image, and outputting an image pickup signal, and said first detection means detects the focus state on the basis of a predetermined signal component, which changes in accordance with the focus state, in the image pickup signal.

18. An apparatus according to claim 17, wherein the predetermined signal component is a high frequency component in the image pickup signal.

19. An apparatus according to claim 16, wherein said second detection means comprises a light-emitting element for radiating infrared light into an eyeball of the photographer, a light-receiving element for receiving light emitted from said light-emitting element and reflected by the eyeball, and a signal processing circuit for calculating position coordinates of the eye point of the photographer on the image screen on the basis of a light-receiving position of the reflected light on said light receiving element.

20. An apparatus according to claim 19, wherein said light-emitting element and said light-receiving element of said second detection means are built in a view finder, and detects the eye point on a detection frame corresponds to a light-receiving surface of said light-receiving element.

21. An apparatus according to claim 16, wherein said control means performs focusing/unfocusing judgment and reactivation judgment on the basis of the output from said first detection means, and controls a driving speed of a focusing lens using information from said second detection means.

22. An apparatus according to claim 21, wherein said control means increases the driving speed of the focusing lens as the amount of sharpness detected by said first detection means is smaller and the relationship of the eye point of the photographer and an average eye point of the photographer detected by said second detection means is larger, and decreases the driving speed of the focusing lens as the amount of sharpness is larger and the relationship between the eye point of the photographer and an average eye point of the photographer detected by said second detection means is smaller.

23. An apparatus according to claim 16, wherein said control means performs focusing/unfocusing judgment using the outputs from said first and second detection means.

24. An apparatus according to claim 16, wherein said control means performs reactivation judgment after focusing using the outputs from said first and second detection means.

25. An apparatus according to claim 16, wherein said control means controls a focus adjustment speed using the outputs from said first and second detection means.

26. An apparatus according to claim 16, wherein said second detection means comprises means for detecting a frequency of eye point change of a user of the apparatus.

* * * * *

UNITED STATES PATENT AND TRADEMARK OFFICE
CERTIFICATE OF CORRECTION

PATENT NO.　: 6,094,222
DATED　　　: July 25, 2000
INVENTOR(S)　: Taeko Tanaka et al.

It is certified that error appears in the above-identified patent and that said Letters Patent is hereby corrected as shown below:

<u>Column 4,</u>
Line 6, before "photoelectric" delete -- 1 --.
Line 36, delete "SO" and insert -- so --.

Signed and Sealed this

Eighteenth Day of December, 2001

Attest:

JAMES E. ROGAN
*Attesting Officer*　　*Director of the United States Patent and Trademark Office*